Jan. 24, 1956  M. H. SCHONWALD  2,732,024

MOTOR VEHICLE OIL DRIP GUARD

Filed Dec. 16, 1954

INVENTOR.
M. H. Schonwald
BY
J. J. Dunlap
ATTORNEY

United States Patent Office 2,732,024
Patented Jan. 24, 1956

2,732,024

MOTOR VEHICLE OIL DRIP GUARD

Milton H. Schonwald, Oklahoma City, Okla., assignor of one-half to Mayer B. Goren, Oklahoma City, Okla.

Application December 16, 1954, Serial No. 475,660

1 Claim. (Cl. 180—69.1)

This invention relates to improvements in motor vehicles, and more particularly to an oil drip guard for use on the underside of automobiles, trucks and the like.

As substantially all automobile owners know, and as will be revealed by a cursory inspection of the underside of an automobile, the bottom of the engine (the oil pan) and the transmission housing are nearly always oily. Many oil pans and transmission housings leak, and oil frequently escapes through the oil overflow pipe of the engine to collect on the bottom of the oil pan. Wherever the oil comes from, it invariably drips from the oil pan and transmission housing onto the owner's driveway and/or garage floor where it accumulates and derogates from the appearance of the property.

The present invention contemplates a novel oil drip guard for the underside of a motor vehicle to receive and collect all of the oil or grease which may drip from the engine or transmission. The guard is secured to the vehicle frame directly under the engine and transmission in such a manner that it will not be affected by wind when the vehicle is driven at high speeds. Further, the guard is secured to the frame in such a manner that it may be easily removed for cleaning or repair. It is also contemplated to provide an absorbent pad on the top surface of the guard, particularly for vehicles having an excessive oil leakage, to absorb the collected oil and prevent spillage of the oil from the guard when the vehicle is tilted or stopped extremely fast.

An important object of this invention is to substantially eliminate oil from dripping onto driveways and garage floors.

Another object of this invention is to provide an oil drip guard for the underside of a motor vehicle which will not be materially affected by wind, as when the vehicle is driven at high speeds.

Another object of this invention is to provide an easily removable oil drip guard for vehicle engines and transmissions.

A further object of this invention is to prevent spillage of oil collected in a motor vehicle drip guard.

A still further object of this invention is to provide a simple, light-weight motor vehicle oil drip guard which may be economically manufactured.

Other objects and advantages of the invention will be evident from the following detailed description, when read in conjunction with the accompanying drawings, which illustrate one embodiment of my invention.

Figure 1:
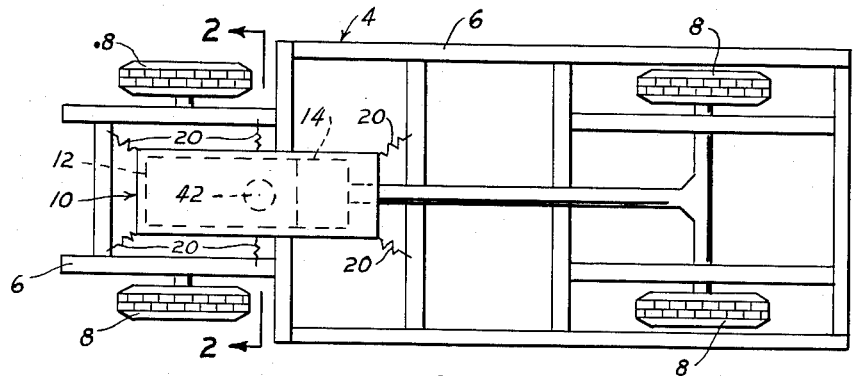
Figure 1 is a bottom view of an automobile, with various parts removed, illustrating the attachment of my novel drip guard.

Referring to the drawings in detail, and particularly Figure 1, reference character 4 generally designates an automobile having the usual frame 6 and wheels 8. My novel drip guard, generally designated at 10, is adapted to cover the lower side of the engine 12 and transmission 14 (shown in dotted lines in Figure 1).

Figure 3:
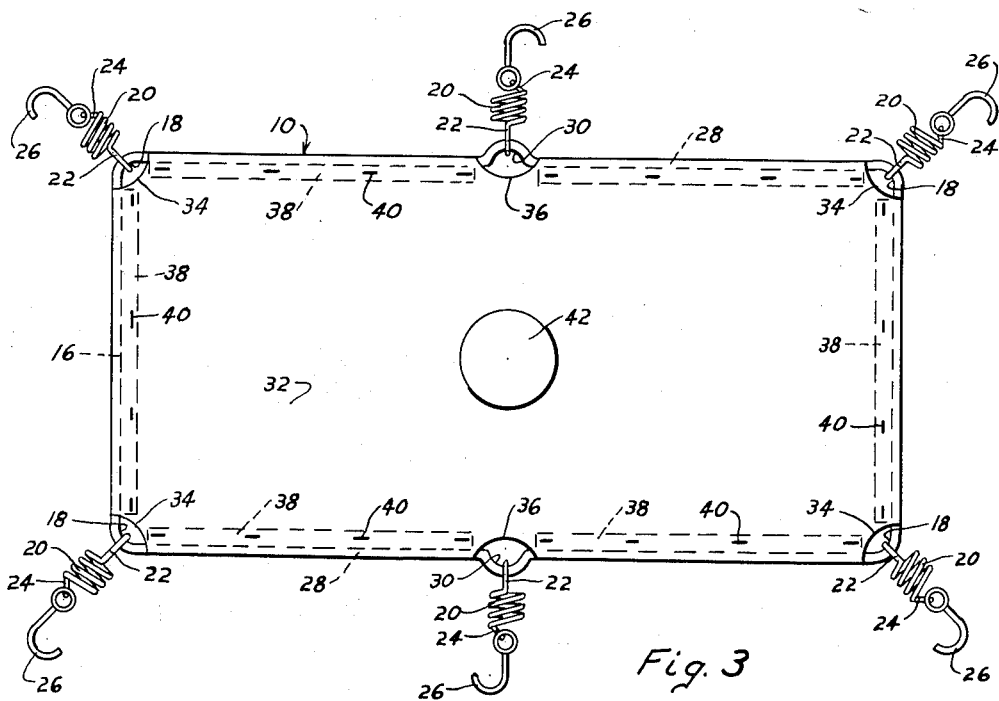
Figure 3 is an enlarged plan view of my novel drip guard.

The guard 10 (see Figure 3) comprises a substantially rectangular frame 16 constructed out of a heavy wire or rod with the opposite ends of the wire rigidly interconnected (not shown) to form a continuous and strong frame. The frame 16 is preferably of a size to extend around the lower portion of the engine 12 and transmission 14. Each corner of the frame 16 is rounded (as shown) or suitably crimped (not shown) to form a socket 18 for convenient connection with a helical tension spring 20. The inner end 22 of each spring 20 may be inserted in the respective socket 18 and bent around the adjacent section of the frame 16 to provide a loose, pivotal connection of the spring to the frame, yet the sides of each socket 18 will deter the springs from sliding along the sides of the frame. The outer end 24 of each spring 20 is suitably secured to a hook 26 for purposes as will be hereinafter set forth.

Each of the longer sides 28 of the frame 16 is also crimped in the central portion thereof to form opposed sockets 30. The sockets 30 receive the inner ends 22 of another pair of helical tension springs 20. The springs 20 associated with the sockets 30 are pivotally secured to the sides 28 of the frame 16 in the same manner as the previously described springs 20. It will also be observed that the last-mentioned springs 20 also have hooks 26 secured to the outer ends 24 thereof to make a total of six hooks and springs for supporting the guard 10.

The frame 16 is covered by a sheet of light-weight, non-inflammable metal or material 32, such as aluminum. U-shaped cuts 34 are made in the corners of the cover 32 to provide clearance around the sockets 18. Similar cuts 36 are made in the long sides of the cover 32 to provide clearance around the sockets 30. In securing the cover 32 to the frame 16, the edges 38 of the cover are turned downwardly over the frame and lapped under the cover (as shown in dotted lines in Figure 3). Whereupon, the edges 38 are secured to the main body portion of the cover 32 in any desired manner, such as by staples 40. It is preferred that the cover 32 be loosely stretched over the frame 16 to provide a sag in the cover 32 when the guard 10 is suspended by the hooks 26, that is, the cover 32 will extend below the frame 16 in the nature of a pocket.

An absorbent pad 42, preferably formed out of a non-inflammable material, may be secured in the central portion of the cover 32 to absorb any oil and grease dripped onto the cover 32 as will be more fully hereinafter set forth. The pad 42 is secured to the upper surface of the cover 32 in any suitable manner, such as by use of an adhesive.

*Operation*

Figure 2:
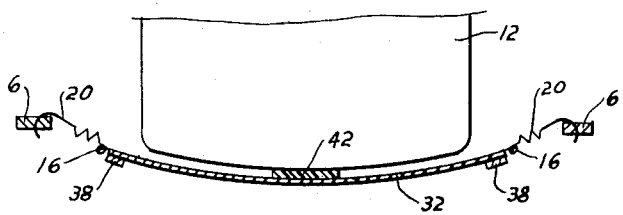
Figure 2 is a partial sectional view of the automobile and drip guard, as taken along lines 2—2 of Figure 1, with the thickness of the drip guard enlarged.

As previously noted, the drip guard 10 is secured to the underside of the automobile 4 underneath the engine 12 and transmission 14. The drip guard 10 is preferably suspended from the automobile frame 6 by drilling apertures (not shown) at spaced points in the frame to receive the hooks 26 as illustrated in Figures 1 and 2. It will be understood that suitable brackets or the like (not shown) may be secured on the frame 6 to receive the hooks—the primary consideration being to provide a simple connection of the hooks to the frame, whereby the drip guard 10 may be easily removed for cleaning or repair.

The helical springs 20 maintain a tension on the guard 10 to retain the frame 16 around the lower portion of the engine 12 and force the pad 42 into close contact with the bottom of the engine 12 as shown in Figure 2. Furthermore, the cover 32 may contact the bottom of the engine 12 or transmission 14 at various points without interfering with the operation of either the automobile 4 or guard 10.

With the guard 10 in operating position as illustrated in Figures 1 and 2, any oil and grease dripping from the engine 12 or transmission 14 will be received and collected by the guard 10. When an appreciable amount of oil drips onto the cover 32, it will drain into the lower central portion of the cover and be absorbed by the pad 42. Therefore, none of the collected oil will be spilled from the guard 10 when the automobile 4 is tilted or rapidly changes its path of movement.

At intervals, as when the automobile 4 is lubricated, the guard 10 may be easily removed for cleaning or repair by simply disengaging the hooks 26 from the frame 6. In the event the pad 42 is saturated with oil and grease, it may be removed and replaced with a clean pad.

From the foregoing it is apparent that the present invention substantially eliminates the drippings of oil from motor vehicles and will enhance the appearance of garage floors and driveways. My novel drip guard collects all oil and grease dripping from the engine and transmission, and the collected oil will not spill from the guard. Furthermore, the guard may be easily removed and replaced, and will not interfere with the operation of the motor vehicle. In addition, the guard will not vibrate to any material extent when the vehicle is in motion, and will not decrease the clearance of the vehicle to any practical extent. The guard is simple in construction and may be economically manufactured.

Changes may be made in the combination and arrangement of parts as heretofore set forth in the specification and shown in the drawings, it being understood that any modification in the precise embodiment of the invention may be made within the scope of the following claim without departing form the spirit of the invention.

I claim:

An oil drip guard for use under the engine and transmission of a motor vehicle, comprising a substantially rectangular frame covering an area substantially equal to the combined bottom area of the vehicle engine and transmission, said frame having a plurality of sockets formed in spaced relation around the periphery thereof, a tension spring pivotally secured at one end in each of said sockets, hooks secured to the opposite ends of said springs arranged to engage the motor vehicle and retain the frame around the lower portion of the vehicle engine and transmission, and a cover loosely stretched over the frame to form a pocket under the engine and transmission for receiving and collecting dripping oil from the engine and transmission, and an absorbent pad secured on the top surface of said cover to absorb the collected oil.

References Cited in the file of this patent

UNITED STATES PATENTS

| | | |
|---|---|---|
| 1,164,864 | Preston | Dec. 21, 1915 |
| 1,182,378 | Jewell | May 9, 1916 |
| 1,615,079 | Grigsby | Jan. 18, 1927 |
| 2,171,813 | Stockstrom | Sept. 5, 1939 |
| 2,231,293 | Norman | Feb. 11, 1941 |